United States Patent [19]

Martin

[11] 3,982,121
[45] Sept. 21, 1976

[54] HEADLAMP TILTING SYSTEM IN A MOTOR VEHICLE

[75] Inventor: Frederick Raymond Patrick Martin, Kent, England

[73] Assignee: The Lucas Electrical Company Limited, Birmingham, England

[22] Filed: Mar. 5, 1975

[21] Appl. No.: 555,714

[30] Foreign Application Priority Data
Mar. 8, 1974 United Kingdom.............. 10455/74

[52] U.S. Cl. .......................... 240/7.1 LJ; 240/61.8
[51] Int. Cl.² ......................................... B60Q 1/10
[58] Field of Search .............. 240/7.1 LJ, 61.6, 61.8

[56] References Cited
UNITED STATES PATENTS
3,840,729   10/1974   Andres ......................... 240/7.1 LJ FOREIGN PATENTS OR APPLICATIONS
1,166,482   10/1969   United Kingdom ........... 240/7.1 LJ

*Primary Examiner*—L. T. Hix
*Assistant Examiner*—Alan Mathews
*Attorney, Agent, or Firm*—Holman & Stern

[57] ABSTRACT

The headlamp tilting system comprises a headlamp tilting mechanism and a headlamp securing mechanism. The headlamp tilting system includes a tensioned cable which leads to a sensor at the rear of the motor vehicle and is connected with a tube having a slidable output rod therein connected with a cross rod upon which headlamps of the motor vehicle are mounted. The tube is movable relative to a body of the vehicle and the output rod is connected with the tube via a pair of springs. The headlamp securing mechanism comprises a lever carrying a catch in the form of a V-shaped notch which is engageable over a pin carried by a lever secured to the cross rod. A spring biasses the lever into a position in which the catch engages the pin but an abutment on the lever engaging a pin in an elongate slot in the rod normally prevents such movement. In the event of a breakage of the cable, the springs within the tube cause a plate on the tube to engage an extension on lever to effect disengagement of the abutment from the pin. This action causes spring to urge the lever so that the catch engages the pin on the lever secured to the cross rod. In this manner, movement of the headlamps is limited.

5 Claims, 1 Drawing Figure

U.S. Patent   Sept. 21, 1976   3,982,121
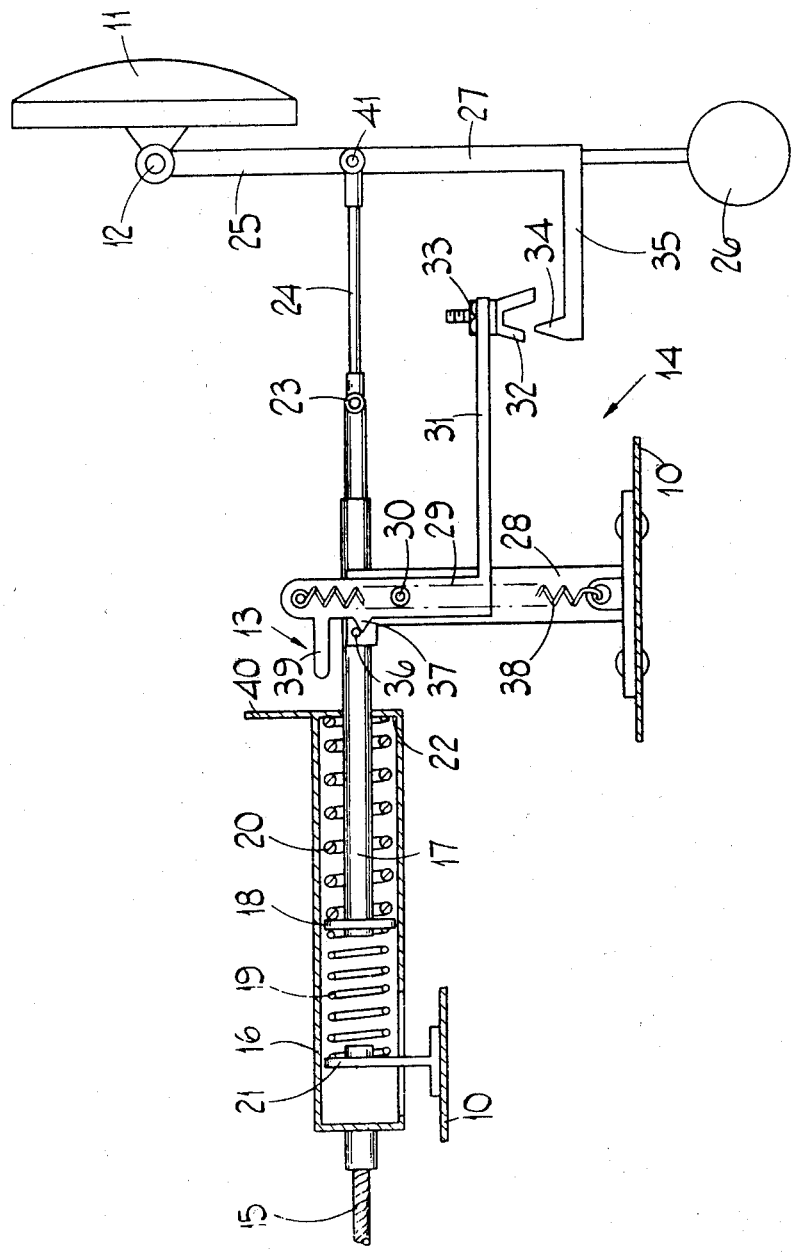

HEADLAMP TILTING SYSTEM IN A MOTOR VEHICLE

This invention relates to a headlamp tilting system in a motor vehicle.

According to the present invention, there is provided in a motor vehicle having a body, wheels on which the body is mounted, and a headlamp mounted for tilting movement on said body, a headlamp tilting system comprising a headlamp tilting mechanism, and a headlamp securing mechanism which is arranged to override the headlamp tilting mechanism and which is normally de-activated to permit the headlamp tilting mechanism to tilt the headlamp, said headlamp tilting mechanism including an element which is normally maintained in tension and which is movable in response to variations in the attitude of the vehicle body relative to wheels thereof caused by variations in the load carried by the vehicle body, and a member disposed in a part of the tilting mechanism which connects said element with said headlamp, said member being biassed towards a positon in which it activates the headlamp securing mechanism, said member being held against movement into said position by said element whereby, when a failure of the headlamp tilting mechanism causes loss of tension in the element, said member moves into its said position to activate the headlamp securing mechanism which is arranged to limit tilting movement of the headlamp.

Preferably, the headlamp securing mechanism includes an abutment member fixedly connected with the headlamp for movement therewith, a spring loaded lever, and a catch connected for movement with the lever and engageable, upon movement of the lever under the action of its spring, with the abutment member so as to limit movement of the latter, the arrangement being such that, when said member in the headlamp tilting mechanism moves into its said position, said member effects movement of the lever so that the spring is triggered and moves the catch into engagement with the abutment member.

In a convenient embodiment, the headlamp tilting mechanism further includes a mass which is mounted to be movable relative to the vehicle body under acceleration and braking forces and arranged to effect tilting of the headlamp in addition to tilting of the headlamp caused by movement of the said element, and the headlamp securing mechanism is arranged so as to permit the headlamps to be tilted under the action of said mass when the headlamp securing mechanism is activated.

Conveniently, such tilting of the headlamps is permitted by arranging a predetermined amount of relative movement between the catch and the abutment member when the two are interengaged.

Conveniently also, the amount of movement between the abutment member and the catch is adjustable.

An embodiment of the present invention will now be described, by way of example, with reference to the accompanying drawing which is a schematic illustration of a headlamp tilting system including a headlamp securing mechanism and part of a headlamp tilting mechanism in a motor vehicle.

Referring to the drawing, the motor vehicle includes a vehicle body 10 (only partly shown in the drawing), wheels (not shown) upon which the vehicle body 10 is suspended, and a pair of headlamps 11 (only one shown) mounted on a rod 12 which extends transversely with respect to the vehicle body 10 and which is angularly movable relative thereto. The headlamp tilting system comprises a headlamp tilting mechanism (indicated generally by reference numeral 13), and a headlamp securing mechanism (indicated generally by arrow 14) mounted in the motor vehicle.

The headlamp tilting mechanism 13 includes a cable 15 which extends along the underside of the motor vehicle body 10 and which is secured at one end to an unsprung part (not shown) of the vehicle. The opposite end of the cable 15 is secured to a tube 16. Surrounding the cable 15 is an outer sleeve (not shown) which abuts against the vehicle body or a sprung part attached thereto. By the expression "sprung part" is meant a part which is connected with the vehicle wheels through the intermediary of the suspension, i.e. a part which moves with the vehicle body relative to the wheels under varying conditions of load. The cable 15 is normally kept under tension and it is to be appreciated that changes in the attitude of the vehicle body 10 relative to the rear wheels of the vehicle caused by changes in the load carried by the rear of the vehicle body 10 will cause the effective length of cable 15 to be changed. In the case of an increase in the load at the rear of the vehicle body, a decrease in the effective length of cable 15 will occur with the result that the tube 16 will be moved to the left as viewed in the drawing.

The headlamp tilting mechanism further includes a rod 17 which extends into the tube 16 and has a shoulder 18 thereon. A pair of compression springs 19 and 20 are engaged against opposite sides of the shoulder 18 and respectively abut against a stop 21 fixed to the body 10 and an end of the tube 16 through which rod 17 passes. The rod 17 is connected by means of a horizontal pivot 23 with one end of a link 24 whose other end is pivotally secured to a lever 25 depending from and fixed to the rod 12. The headlamp tilting mechanism further includes a mass 26 which is secured on the bottom end of a rod 27 also depending from and secured to the rod 12.

The rod 17 has an elongate slot (not shown) therethrough whose purpose will be described hereinafter.

The headlamp securing mechanism 14 comprises a bracket 28 which is secured to the vehicle body 10 and which carries a lever 29 through the intermediary of a horizontal pivot 30 the mechanism 14 further comprises an arm 31 which extends from the lever 29 below pivot 30 forwardly of the motor vehicle body 10. The free end of the arm 31 carries a catch in the form of an inverted V-shaped notch 32 whose vertical position relative to arm 31 can be adjusted by means of a nut 33. The headlamp securing mechanism 14 further includes an abutment member in the form of an upwardly pointing pin 34 disposed below notch 32 and secured to an integral extension 35 of the lever 25.

The mechanism further includes a horizontal pin 36 which is secured to the bracket 28 and which passes through the elongate slot in the rod 17 so as to act as a support therefor but to permit linear movement of rod 17 relative thereto. The pin 36 provides a latch device for the lever 29 and an abutment 37 on the lever 29 is engageable with the pin 36. A tension spring 38 is anchored at one end to the bracket 28 and at the other end to the lever 29. The arrangement is such that, when the abutment 37 is engaged against the pin 36, the line of action of spring 38 lies just to the left of pivot 30 as viewed in the drawing. However, when the lever 29 is moved in a clockwise direction about pivot 30 until the abutment 37 is disengaged from the pin 36, the line of action of the spring 38 lies to the right of the pivot 30 as viewed in the drawing and so urges the lever 29 to pivot in a clockwise direction about pivot 30 until the notch 32 engages against the pin 34.

The lever 29 is provided with a lateral extension 39 whose free end is spaced from a plate 40 carried by the tube 16. In use, the tension in the cable 15 holds the pin 36, pivot 23 and a pivot 41 between link 24 and lever 25 in alignment.

If a load on the rear of the motor vehicle body 10 is increased, the effective length of cable 15 shortens and draws tube 16 to the left as viewed in the drawing. This increases the pressure exerted by spring 20 on shoulder 18 and tends to release the pressure thereon by spring 19. This upsets the equilibrium between the springs and this equilibrium is re-established by the abutment 18 moving to the left as viewed in the drawing until the pressure in the two springs 19 and 20 is equalised. Assuming that the two springs 19 and 20 are of equal strength, it follows that the shoulder 18 will move to the left as viewed in the drawing by an amount which is half the length by which cable 15 has been shortened. Since shoulder 18 is secured to rod 17, the latter will be moved a corresponding amount. The rod 17 slides relative to pin 36 and causes the lever 25 to move in an anti-clockwise direction about the pivot axis of rod 12. As a result of this, the rod 12 pivots and causes downward tilting of the headlamps 11 by an amount which corresponds to the loading of the rear of the motor vehicle body. In this way, light beams projected by the headlamps 11 in use are maintained at the same level in spite of the increase in the load at the rear of the vehicle body.

The converse occurs when the load on the rear of the vehicle body 10 is lightened, in this case, tube 16 moves to the right as viewed in the drawing, and rod 17 moves half the distance to the right to cause the headlamps 11 to be given a compensating upward tilt.

Under conditions of braking, the pendulum 26 moves forward relative to cross rod 12 and, due to the presence of rod 27, causes upward tilting of the headlamps to compensate for downward dipping of the front of the motor vehicle body 10 under braking conditions. The converse happens under acceleration conditions where downward tilting of the headlamps occurs.

In the event of a release in the tension of cable 15 caused by brakeage of the latter or by disconnection either from the unsprung part of the motor vehicle to which it is attached or from the tube 16, the release in tension causes the tube 16 to move to the right under the action of springs 19 and 20 until the plate 40 engages against extension 39. The power of the springs 19 and 20 is such that the plate 40 moves lever 29 in a clockwise direction about pivot 30 until the abutment 37 becomes disengaged from pin 36. In this condition, the line of action of spring 38 has passed through the axis of pivot 30 and the spring then causes the lever 29 to be moved quickly into its position in which notch 32 is engaged on pin 34. In this way, tilting movement of the headlamps 11 is limited because only a limited amount of movement of lever 25 is permitted, the amount of movement permitted being dependent upon the amount of relative movement which can occur between pin 34 and notch 32. In the present embodiment, 1/10 inch of movement is permitted which allows the cross rod 12 to move under the action of mass 26 only. When the tension in cable 15 is thus released and the spring 38 triggered, the tube 16 and rod 17 pivot downwardly about the axis of pin 36 whilst the pivot 23 moves upwardly as viewed in the drawing.

It will be appreciated that the spacing between plate 40 and the free end of extension 39 is so chosen that the two will not become engaged during normal movements of the tube 16.

In order to reset the arrangement, the necessary repairs are effected to the headlamp tilting mechanism 13 and the lever 29 is moved manually in an anti-clockwise direction about pivot 30 until the abutment 37 lies against pin 36.

I claim:

1. In a motor vehicle having a body, wheels on which said body is mounted and a headlamp mounted for tilting movement on said body, a headlamp tilting system comprising a headlamp tilting mechanism, and a headlamp securing mechanism which is arranged to override said headlamp tilting mechanism and which is normally de-activated to permit said headlamp tilting mechanism to tilt said headlamp, said headlamp tilting mechanism including an element which is normally maintained in tension and which is movable in response to variations in the attitude of said vehicle body relative to said wheels caused by variations in the load carried by said vehicle body, and a member disposed in a part of said headlamp tilting mechanism which connects said element with said headlamp, said member being arranged to activate said headlamp securing mechanism when it moves into a predetermined position, said member being biassed towards said predetermined position but being held against movement into said predetermined position by the tension in said element whereby, when a loss of tension occurs in said element, said member moves into its said predetermined position under the action of its bias to activate said headlamp securing mechanism which is arranged to limit tilting movement of said headlamp.

2. The headlamp tilting system according to claim 1, wherein the headlamp securing mechanism includes an abutment member fixedly connected with the headlamp for movement therewith, a spring loaded lever, and a catch connected for movement with the lever and engageable, upon movement of the lever under the action of its spring, with the abutment member so as to limit movement of the latter, the arrangement being such that, when said member in the headlamp tilting mechanism moves into its said predetermined position, said member effects movement of the lever so that the spring is triggered and moves the catch into engagement with the abutment member.

3. The headlamp tilting system according to claim 1, wherein the headlamp tilting mechanism further includes a mass which is mounted to be movable relative to the vehicle body under acceleration and braking forces and arranged to effect tilting of the headlamp in addition to tilting of the headlamp caused by movement of the said element, and the headlamp securing mechanism is arranged so as to permit the headlamps to be tilted under the action of said mass when the headlamp securing mechanism is activated.

4. The headlamp tilting system according to claim 3, wherein tilting of the headlamps under acceleration and braking forces is permitted by arranging a predetermined amount of relative movement between the catch and the abutment member when the two are interengaged.

5. The headlamp tilting system according to claim 4, wherein the amount of movement between the abutment member and the catch is adjustable.

* * * * *